Nov. 1, 1938.   G. B. MEANLEY   2,134,725

MEASURING DEVICE

Filed June 25, 1937

Inventor
Gerald B. Meanley

By Lyon & Lyon
Attorneys

Patented Nov. 1, 1938

2,134,725

UNITED STATES PATENT OFFICE 2,134,725

MEASURING DEVICE

Gerald B. Meanley, Miramar, Calif.

Application June 25, 1937, Serial No. 150,373

2 Claims. (Cl. 221—112)

This invention relates to measuring devices, and is intended particularly to be used on containers for dispensing small quantities of a granulated substance, such as sugar, or similar substances.

One of the objects of the invention is to provide a device of this kind of simple construction, which will operate effectively to measure the material being delivered.

In its preferred form, the device includes a slide or gate, which is normally in an open position so as to permit the measuring chamber to stand filled with the material that is to be measured; and one of the objects of the invention is to provide simple means for operating the bottom closure of the measuring chamber after the slide or gate has completely closed the opening from the container into the measuring chamber.

A further object of the invention is to improve and simplify the general construction of apparatus of this kind.

Further objects of the invention will appear hereinafter.

The invention consists in the novel parts and combination of parts to be described hereinafter, all of which contribute to produce an efficient measuring device.

A preferred embodiment of the invention is described in the following specification, while the broad scope of the invention is pointed out in the appended claims.

Figure 1:
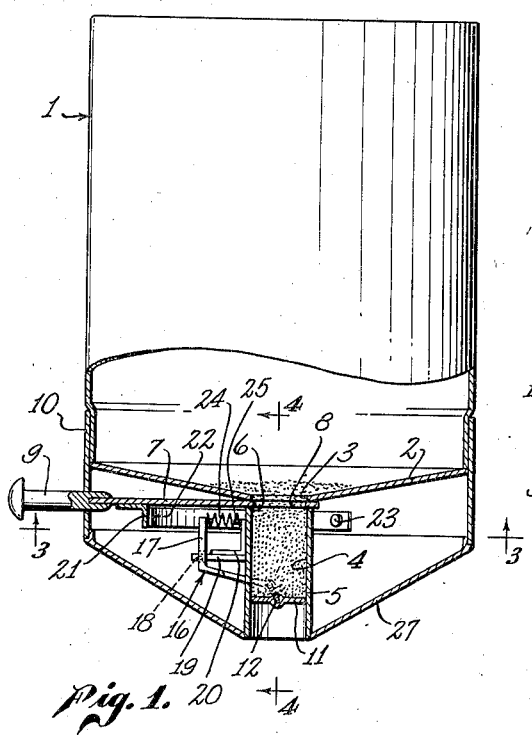
Fig. 1 is a side elevation of a container embodying my invention, and showing the lower portion of the container and my measuring mechanism in cross-section. This view shows the measuring mechanism in its normal position.

Referring more particularly to the parts, 1 indicates a container of any suitable form and provided with a wall through which the material to be measured gravitates, or is forced. In the present instance, this wall is a bottom or head 2 at the lower end of a container, which bottom is preferably slightly dished as shown, so as to facilitate the gravitation of the material within the container toward a central opening 3 through which the material can pass by gravity into a measuring chamber 4. This measuring chamber is preferably the upper portion of the interior of the cylindrical spout 5, and extends downwardly from the bottom wall 2; but, however, with the upper end 6 of the spout located a slight distance from the plane of the opening 3 so as to leave clearance for a slide or gate 7. This slide or gate is in the form of an elongated plate having an opening 8 therein to register with the opening 3 in the open position of the gate, as shown in Fig. 1. The outer end of the slide 7 carries a hand-actuated plunger 9 guided through a cylindrical band or collar 10 that supports the container 1. This collar 10, in practice, is preferably secured on a wall bracket or any other suitable support. The container 1 can be filled and then applied in an inverted position within the collar 10; that is to say, the position indicated in Figs. 1 and 2.

When the gate 7 is actuated by pushing in on the plunger 9, the opening 8 in the gate will move out of alignment with the opening 3, and the gate will then cut off communication from the interior of the container to the measuring chamber 4. After the gate is sufficiently closed, it automatically operates the lower closure that closes the lower end of the chamber 4.

Figure 2:
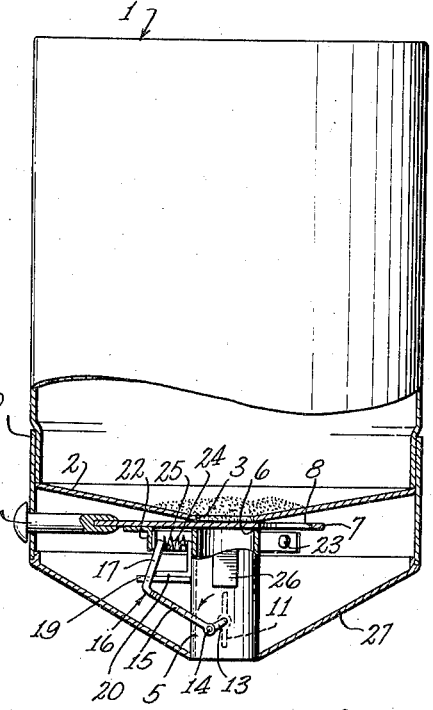
Fig. 2 is a view similar to Fig. 1, but showing the measuring mechanism in partial elevation; this view also shows the measuring mechanism in the opened position of the lower closure that dumps the measured amount from the measuring chamber.

In order to accomplish this, I prefer to provide a rotary closure 11 for the lower part of the chamber 4, said closure being in the form of a disc or butterfly valve mounted on a shaft 12 that extends diametrically through the tubular spout 5. The end of this shaft is provided with means to enable it to be rotated by the inwardly moving gate 7. In the present instance I prefer to provide each end of the shaft 12 with a crank 13, and these cranks are pivotally attached at 14 to the forks 15 respectively, of a yoke 16, said yoke consisting of a rocker capable of being rocked by the inwardly moving gate 7. In order to simplify the construction, this rocker is formed with a vertically projecting actuating arm 17 that is bent at an angle to the forks 15 (see Fig. 1). These forks 15, as illustrated, preferably incline downwardly somewhat from a horizontal line. Near the junction of the actuating arm 17 and the yoke 16, the arm 17 is provided with an opening 18 that fits loosely on a pintle 19 carried on a bracket 20 secured to the side of the spout. In order to actuate the arm 17, I provide a moving part moving with the slide, and the arm 17 projects into the path of this part. In the present instance, the actuating part on the slide is a dog 21, which may be of angle form, as illustrated. As the slide or gate 7 completes its inward movement, this dog 21, or a leaf spring 22 moving with the dog, will engage the end of the arm 17 and move it toward the right. This will cause a rocking movement of the yoke 16 on the pin 19, and swing the crank arms 13 downwardly so as to open the bottom closure 11, as indicated in Fig. 2.

Figure 3:
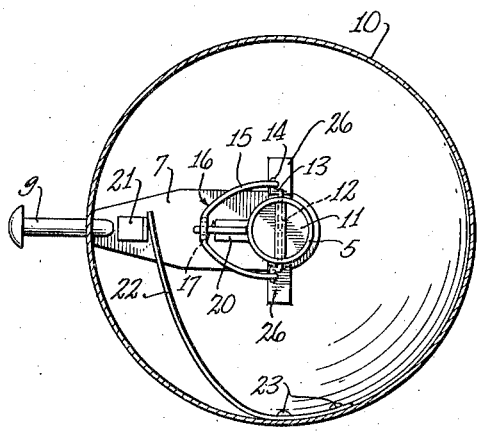
Fig. 3 is a section taken in the plane of the line 3—3 of Fig. 1, and looking upwardly.

The spring 22 is preferably in the form of a leaf spring, one end of which is riveted at 23 to the inner side of the collar 10 (see Fig. 3). This spring, of course, will return the gate 7 after it has been actuated. The actuating arm 17 for the rotary closure 11 is far enough away from the dog 21 and the end of the spring 22 to insure that the closure 11 will not be opened until the gate 7 has completely closed.

I provide means for holding the rotary closure 11 normally in its closed position. This is preferably accomplished by providing a small coil spring 24 between the inner side of the actuating arm 17 and the side of the spout 5. The ends of this spring can be supported on pins 25 projecting into the spring, as shown in Fig. 1.

Figure 4:
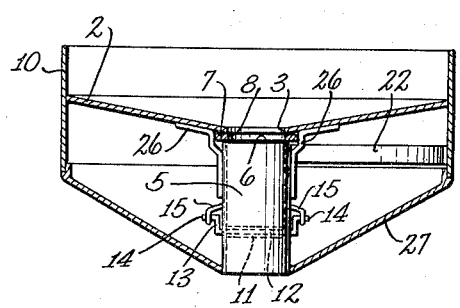
Fig. 4 is a section taken on the line 4—4 of Fig. 1.

The spout 5 is supported at each side on small brackets or metal straps 26, having extensions above that are secured to the under face of the bottom 2, and having extensions below that are secured to the sides of the spout (see Fig. 4). These brackets are bent around the edges of the gate so as to guide the gate, and at the same time permit sufficient clearance for operating the same.

If desired, the measuring mechanism can be concealed by means of a conical cap or head 27 that can be removed when necessary, to gain access to the measuring mechanism.

It will be evident that this measuring device can be used for measuring any kind of granulated or powdered material. The capacity of the measuring chamber 4 would be adapted for particular use of the device; for example, if it is employed to measure sugar, the chamber 4 should have substantially the capacity of one teaspoon. If the device is used in the kitchen for measuring flour or similar material, the chamber 4 could have the capacity of a teacup.

What I claim is:

1. In a measuring device, the combination of a container having a wall with an opening, a spout extending beyond said opening and having a measuring chamber therein, a gate mounted to slide transversely to said spout adjacent said opening, means for supporting said spout on said wall adjacent the side edges of said gate, said gate having an opening therethrough substantially aligning with the opening in the position of rest of the gate to permit the measuring chamber to fill with material from the container, a rotary closure in the lower portion of the measuring chamber mounted to rotate on an axis extending transversely to the axis of said spout, said rotary closure having a crank at each side of the spout, said gate having a moving part moving therewith, a rocker supported on the side of the spout having forks connected respectively with the cranks for rotating the rotary closure, said rocker having an actuating arm projecting in the path of the said moving part and engaged by said moving part near the end of the closing movement of the gate and operating to open the rotary closure after the gate has closed.

2. In a measuring device, the combination of a container having a wall with an opening, a spout extending beyond said opening and having a measuring chamber therein, a gate mounted to slide transversely to said spout adjacent said opening, means for supporting said spout on said wall adjacent the side edges of said gate, said gate having an opening therethrough substantially aligning with the opening in the position of rest of the gate to permit the measuring chamber to fill with material from the container, a rotary closure in the lower portion of the measuring chamber mounted to rotate on an axis extending transversely to the axis of said spout, said rotary closure having a crank at each side of the spout, said gate having a moving part moving therewith, a rocker supported on the side of the spout having forks connected respectively with the cranks for rotating the rotary closure, said rocker having an actuating arm projecting in the path of the said moving part and engaged by said moving part near the end of the closing movement of the gate and operating to open the rotary closure after the gate has closed, and a spring for normally holding the rotary closure in its closed position.

GERALD B. MEANLEY.